March 11, 1947.  A. J. WEATHERHEAD, JR  2,417,224
DIFFERENTIAL TURBINE FOR FLUID TRANSMISSION
Filed Jan. 6, 1944  2 Sheets-Sheet 1

INVENTOR.
ALBERT J. WEATHERHEAD JR
BY Richey & Watts
ATTORNEYS

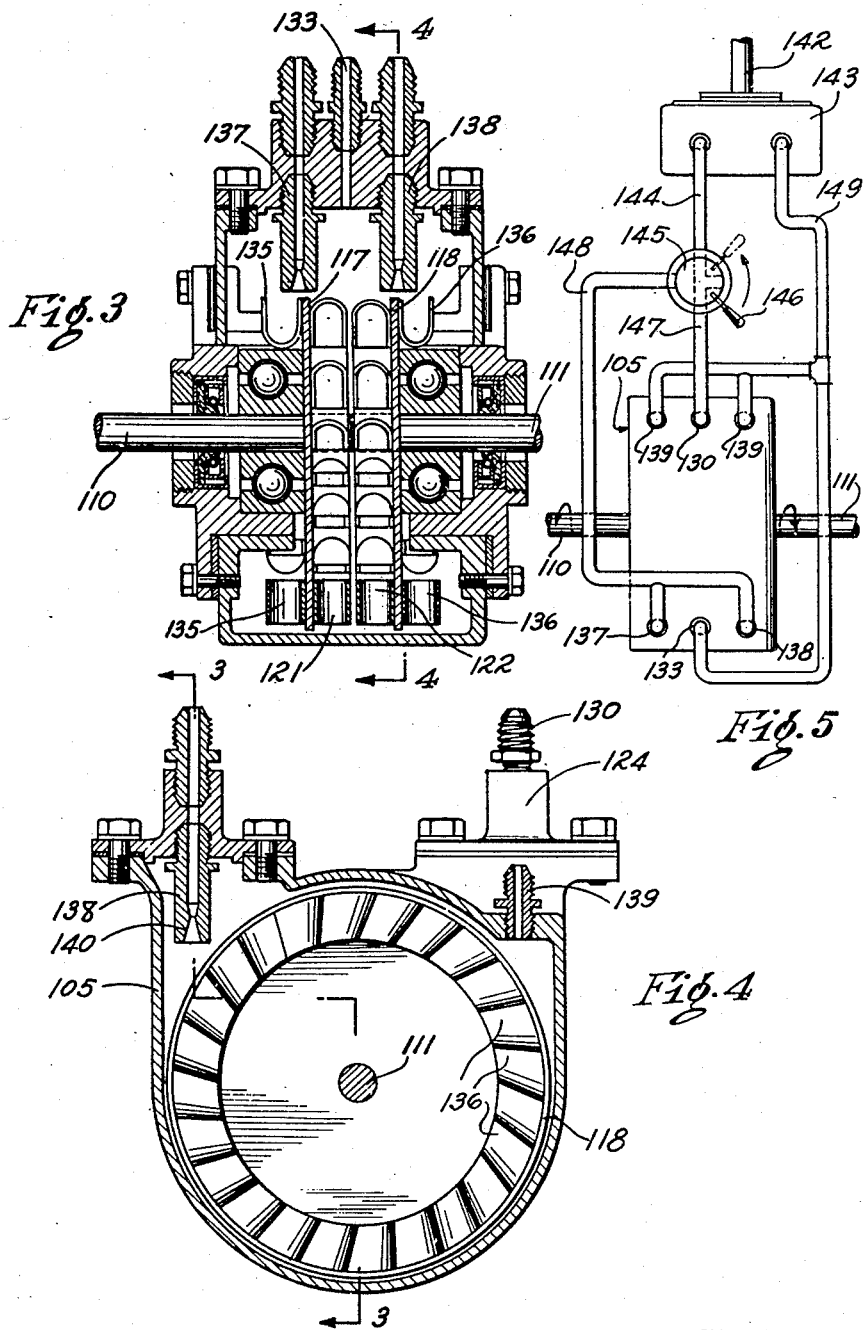

Patented Mar. 11, 1947

2,417,224

UNITED STATES PATENT OFFICE 2,417,224

DIFFERENTIAL TURBINE FOR FLUID TRANSMISSION

Albert J. Weatherhead, Jr., Shaker Heights, Ohio, assignor to The Weatherhead Company, Cleveland, Ohio, a corporation of Ohio Application January 6, 1944, Serial No. 517,163

1 Claim. (Cl. 253—25)

This invention relates to a fluid power transmission, and more specifically to a differential fluid turbine.

The principal object of this invention is to drive two shafts, or driven members, through a fluid turbine, so that the relative speed of the shafts may vary in accordance with variations in the loads imposed thereon.

A further object is to combine two driven shafts with a hydraulic turbine to drive the shafts, so that the single unit may replace a driving gear and a differential gear set.

Other objects are to transmit power from a prime mover to a pair of coaxial shafts through a fluid turbine serving as a differential, and to drive the turbine in either direction with fluid from the prime mover so as to permit reversing the direction of rotation of the driven shaft.

Other objects relating to details of construction and economies of manufacture will appear hereinafter.

In the accompanying drawings:

Fig. 3 is a section through a modified form embodying a reverse drive, the section being taken substantially on the line 3—3 of Fig. 4;

Fig. 4 is a section taken on the line 4—4 of Fig. 3; and

Fig. 5 is a diagrammatic view of a driving member arranged to drive the driven shafts through a coupling embodying the invention.

Figure 1:
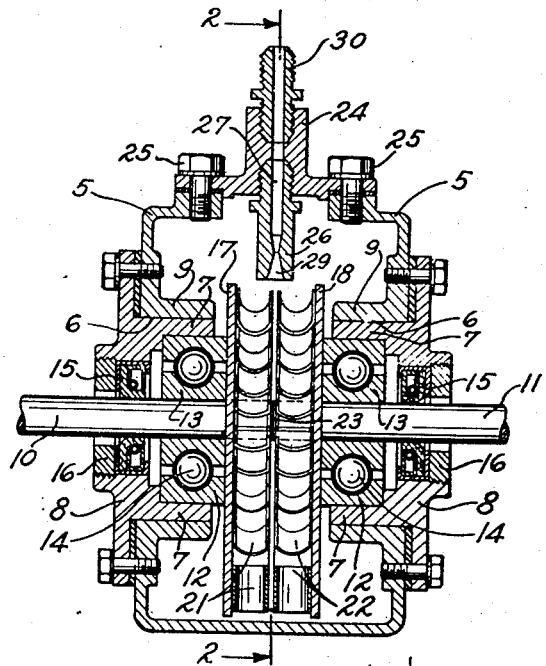
Fig. 1 is a section through a turbine embodying this invention, taken substantially on the line 1—1 of Fig. 2.
Figure 2:
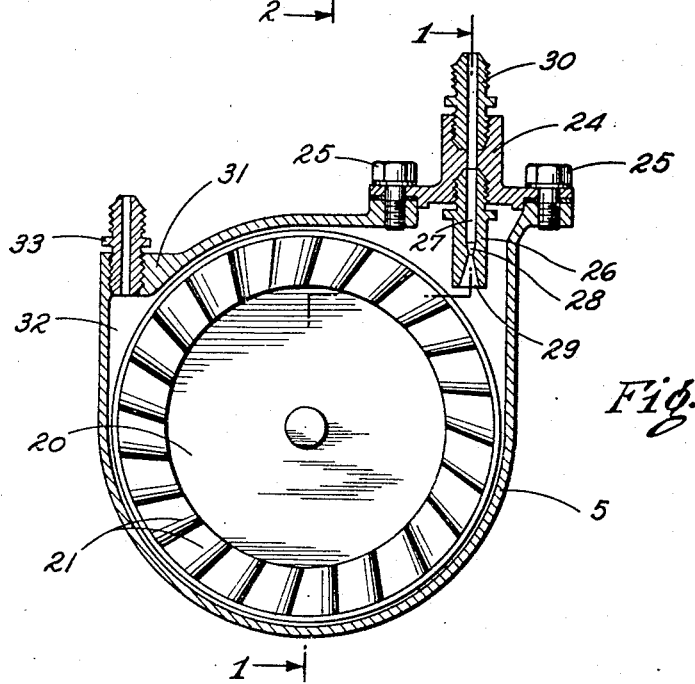
Fig. 2 is a section taken on the line 2—2 of Fig. 1.

Referring to Figs. 1 and 2 of the drawings, the turbine is enclosed in a generally cylindrical casing 5. The side walls of the casing 5 are formed with aligned openings 6 into which are fitted flanges 7 carried by bearing caps 8. The casing 5 is preferably formed with inwardly extending cylindrical flanges 9 fitting against the outer surface of the flanges 7. Aligned driven shafts 10 and 11 are supported in the opposite bearing caps 8 by suitable anti-friction bearings. As shown, each flange 7 carries a ball race 12, and cooperating ball races 13 are carried by the shafts 10 and 11, with ball bearings 14 operatively disposed between the two races. A fluid seal 15 of any suitable type is mounted in each bearing cap 8 and held in position by a nut 16. The shafts 10 and 11 extend freely through central apertures in the nuts 16.

The inner ends of the shafts 10 and 11 are provided with rotors carrying turbine blades of any desired type, the two sets of blades being disconnected from each other but positioned closely adjacent each other. In the embodiment illustrated the shafts 10 and 11 are provided with spaced discs 17 and 18 of a diameter to fit closely within the major portion of the inner circumference of the casing 5. A plurality of blades 21 are mounted on the disc 17 on the shaft 10, and a similar set of blades 22 are mounted on the disc 18 on the shaft 11. The ends of the shafts 10 and 11 may be extended to engage each other as indicated at 23 to maintain a narrow spacing between the blades 21 and 22. Any other suitable form of thrust bearing may, if desired, be provided between the shafts 10 and 11.

A fitting 24 is secured to the top of the casing in any suitable manner, as by the bolts 25, and supports an inlet nozzle 26 directed tangentially to the blades 21 and 22. The nozzle 26 is provided with an inlet bore 27, a Venturi restriction 28, and a flared nozzle opening 29. A fluid pressure supply line is connected to the nozzle 26 in any suitable manner as by a fitting 30 screwed into the outer surface of the fitting 24, both fittings being provided with bores axially aligned with the inlet bore 27 of the nozzle 26.

The nozzle 26 is directed tangentially against the blades 21 and 22 and is located centrally with respect to the two sets of blades 21 and 22 so that the fluid stream ejected by the nozzle 26 is divided equally between the two sets of blades 21 and 22. The blades 21 and 22 are cupped in the axial direction, as illustrated, so that the adjacent edges of the two sets of blades split the fluid stream from the nozzle 26 and each blade directs its part of the stream arcuately across the blade so that the energy of the fluid is transmitted to the shafts with as little loss as possible.

In the radial direction the blades 21 and 22 may be substantially straight as illustrated in Fig. 2 and are preferably set at an angle to the radii of the discs 17 and 18 so as to be presented substantially perpendicular to the stream of fluid entering through the nozzle 26.

An outlet is formed in the casing, preferably at a point about 270° from the point where the stream from the inlet nozzle 26 strikes the blades 21 and 22. As illustrated, the casing 5 is formed with a shoulder 31 providing a generally triangular pocket 32 between the casing and the circle defined by the outer edges of the blades 21 and 22. A pipe fitting 33 may be screwed through the shoulder 31, as shown, to provide an exit passage preferably arranged substantially parallel with the inlet nozzle 26 on the opposite side of the rotors.

With this arrangement fluid under pressure pumped into the inlet nozzle 26 through the supply pipe is delivered through the flared opening 29 at a high velocity by reason of the Venturi restriction 28. The entering stream of fluid initially strikes the blades 21 and 22 and imparts energy to the two shafts 10 and 11 by the impact of the fluid against the blades. Normally the forward momentum of the fluid is not completely absorbed by the impact of the fluid against the blades and the fluid continues to impart energy to the shafts 10 and 11 as it is carried around between adjacent blades and within the casing 5. As the shafts rotate the fluid trapped between each pair of adjacent blades enters the space 32 and is forcibly directed toward the outlet bore through the fitting 33. Thus in operation a layer of fluid is normally present adjacent the outer edges of the blades 21 and 22 and is retained therein by the casing wall 5 and discharged through the discharge fitting 33 so that the blades are substantially free of fluid when they are again presented to the inlet nozzle 26.

Normally the two shafts 10 and 11 are driven at the same speed of rotation with a given pressure and velocity of the fluid entering through the inlet nozzle 26, assuming that the load or resistance on the two shafts is equal. Any variation of the load on the one shaft with respect to the load on the other permits one shaft with its set of blades 21 or 22 to rotate more rapidly than the other shaft. Such variation in the speed of rotation of the two shafts does not affect the quantity of fluid initially delivered to the two sets of blades so that the total torque on the two shafts remains substantially constant.

In Figs. 3 and 4 I have illustrated a modification in which the discs 117 and 118 carry on their outer surfaces turbine blades or buckets 135 and 136 respectively. On opposite sides of the outlet 133 the casing 105 is provided with a pair of inlet nozzles 137 and 138 positioned to direct streams of fluid against the blades 135 and 136 so as to rotate the two shafts 110 and 111 in the opposite direction from that in which they are driven by the single inlet 124. Outlet fittings 139 are arranged on opposite sides of the main inlet fitting 124 to discharge the fluid entering through the nozzles 137 and 138 when the shafts are being driven in reverse. Each of the inlet nozzles 137 and 138 is provided with a Venturi restriction 140 in the same manner as the inlet nozzle 26 previously described. The fluid supply to the main nozzle 130 may be cut off and the fluid supply to the nozzles 137 and 138 simultaneously opened so that the streams of fluid from the nozzles 137 and 138 serve to bring the shafts 110 and 111 to rest and then drive them in the reverse direction. Since the fluid delivered by the nozzles 137 and 138 is free to pass axially within the casing it may enter the spaces between the blades 121 and 122 and thus serve to exert a force tending to maintain the speed of the shafts 110 and 111 the same when the shafts are being driven in reverse.

I have shown diagrammatically in Fig. 5 an arrangement in which the two shafts 110 and 111 are driven differentially by a single driving member. The drive shaft 142 is arranged to be rotated by any suitable prime mover, and is connected to a fluid pump 143 of any desired type. A pipe 144 leads the fluid under pressure delivered by the pump to a three-way valve 145. When the handle 146 of the valve 145 is in the full line position, fluid under pressure is directed into the pipe 147 leading to the inlet fitting 130 in the turbine casing 105. When the handle of the valve 145 is moved to the dotted line position, the pressure fluid is directed into the pipe 148 leading to the two inlet nozzles 137 and 138. The outlet fittings 133 and 139 are in constant communication with the pipe 149 connected to the low pressure side of the pump 143 as to return the fluid to the pump regardless of the position of the valve.

Although preferred embodiments of the invention have been described in considerable detail, it will be understood that many variations and modifications may be resorted to without departing from the scope of the invention as defined in the following claim.

I claim:

A differential turbine comprising a casing, a pair of aligned shafts journalled in said casing, a set of turbine blades arranged circumferentially about each of said shafts and positioned closely adjacent each other, said blades being cupped and having their concave sides facing in the same direction, a second set of blades carried by each of said shafts, said second sets of blades being cupped and having their concave sides facing in the opposite direction to the first mentioned set of blades, an inlet nozzle formed in said casing arranged to direct a stream of fluid under pressure at the adjacent side edges of the concave faces of said first mentioned set of blades, an outlet opening in said casing spaced circumferentially from said inlet nozzle, spaced auxiliary nozzles aligned with said outlet opening and arranged to direct fluid against said second sets of blades and auxiliary outlet openings for said second sets of blades aligned with said inlet nozzle.

ALBERT J. WEATHERHEAD, JR.

REFERENCES CITED

The following references are of record in the file of this patent:

UNITED STATES PATENTS

| Number | Name | Date |
| --- | --- | --- |
| 2,194,316 | Messinger | Mar. 19, 1940 |
| 2,024,663 | Schrag | Dec. 17, 1935 |
| 578,759 | McElroy | Mar. 16, 1897 |
| 600,007 | Langer | Mar. 1, 1898 |
| 865,160 | Clark | Sept. 3, 1907 |
| 752,545 | De Goede | Feb. 16, 1904 |

FOREIGN PATENTS

| Number | Country | Date |
| --- | --- | --- |
| 382,963 | Galvin (French) | 1908 |
| 8,975 | Dureigne (British) | 1913 |
| 4,638 | Enock (British) | 1899 |